United States Patent [19]
Hamabe et al.

[11] Patent Number: 5,227,113
[45] Date of Patent: Jul. 13, 1993

[54] PROCESS FOR THE HIGH SPEED PRODUCTION OF FIBER REINFORCED PLASTIC

[75] Inventors: Kenji Hamabe; Tomohiro Sakuraba; Hiroshi Kiyomoto, all of Saitama; Kazuhiro Miura, Tokyo; Masato Ishibashi; Keiichi Satoh, both of Saitama; Masataka Kumata, Tokyo, all of Japan

[73] Assignee: Honda Giken Kogyo Kabushiki Kaisha, Tokyo, Japan

[21] Appl. No.: 365,610

[22] Filed: Jun. 13, 1989

[30] Foreign Application Priority Data

| Jun. 13, 1988 | [JP] | Japan | 63-143681 |
| Jun. 13, 1988 | [JP] | Japan | 63-143682 |
| Nov. 4, 1988 | [JP] | Japan | 63-278728 |
| Apr. 6, 1989 | [JP] | Japan | 1-87668 |

[51] Int. Cl.$^5$ ............................................. B29C 41/20
[52] U.S. Cl. .................... 264/258; 264/517; 264/571
[58] Field of Search ........... 264/257, 258, 517, 313, 264/314, 316, 571; 425/80.1

[56] References Cited

U.S. PATENT DOCUMENTS

| 1,842,008 | 1/1932 | Borer | 425/80.1 |
| 2,596,364 | 5/1952 | Brennan | 264/517 |
| 2,885,731 | 5/1959 | Fraula et al. | 425/339 |
| 3,210,230 | 10/1965 | Tyhurst | 264/309 |
| 3,309,450 | 3/1967 | Rodgers | 264/257 |
| 3,428,518 | 2/1969 | Schafer | 264/152 |
| 4,101,254 | 7/1978 | Wiltshire | 425/82.1 |
| 4,304,751 | 12/1981 | Li et al. | 264/322 |
| 4,388,263 | 6/1983 | Prunty | 264/257 |
| 4,390,336 | 6/1983 | Ziegler | 425/82.1 |
| 4,390,489 | 6/1983 | Segal | 264/316 |
| 4,599,252 | 7/1986 | van Hattem et al. | 264/109 |
| 4,657,717 | 4/1987 | Cattanach et al. | 264/10.2 |
| 4,714,424 | 12/1987 | Kinugasa et al. | 264/571 |
| 5,028,374 | 7/1991 | Imao et al. | 264/517 |

FOREIGN PATENT DOCUMENTS

| 502817 | 12/1954 | Italy | 264/517 |
| 56-37892 | 9/1981 | Japan . | |

Primary Examiner—Tim Heitbrink

[57] ABSTRACT

A process for the high speed production of fiber reinforced plastic moldings forms several preforms which are solidified with chopped fibers, resin powders and a binder and are held between two preheating plates. Each plate is formed of a thin metal plate and will preheat the preforms to a temperature higher than the melting point of the resin. While the preforms are held between the preheating plates, the preforms are cold-pressed in a mold maintained at a temperature lower than the melting point of the resin for simultaneous impregnation and cooling of the resin. In addition, a preforming mold is placed in a vacuum chamber and precut chopped fibers are positioned in a tank. The preforming mold is placed into the tank and an exhauster is actuated to vacuumize both the vacuum chamber and the preforming mold, thereby adsorbing the chopped fibers in the tank onto the preforming mold and forming on the surface of the preforming mold an unsolidified preform comprising the chopped fibers. Resin powders are sprayed onto the preform for adsorption. A binder is subsequently applied under reduced pressure onto the preform. After drying the preform, the chopped fibers along with the binder are solidified.

6 Claims, 9 Drawing Sheets

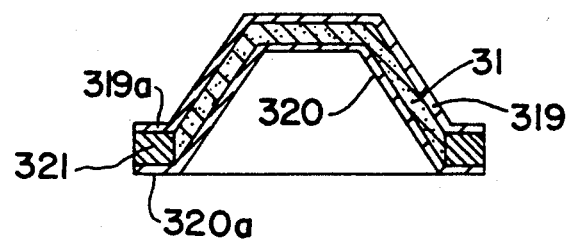
FIG. 12(d)
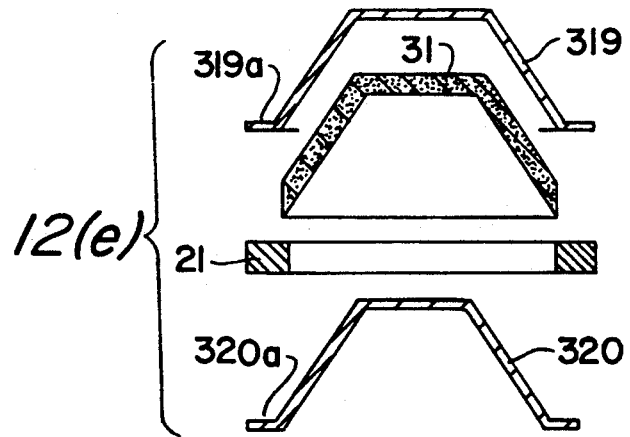

PROCESS FOR THE HIGH SPEED PRODUCTION OF FIBER REINFORCED PLASTIC

BACKGROUND OF THE INVENTION

1. Field of the Invention

The present invention relates to a process for the high speed production of fiber reinforced plastic moldings (hereinafter referred to as FRP moldings).

A second embodiment of the present invention relates to a process for the production of fiber reinforced plastic preforms used for the production of FRP moldings.

A third embodiment of the present invention relates to a process for molding materials used for the production of fiber reinforced composites including a synthetic resin matrix and reinforcing fibers dispersed throughout the synthetic resin matrix.

A fourth embodiment of the present invention relates to a die system for making fiber reinforced plastic moldings including portions substantially vertically disposed with respect to the main parts and a method for making fiber reinforced plastic moldings with the use of such a die system.

2. Description of Background Art

Conventional processes for producing FRP moldings have disadvantages in that the molds should be heated and cooled each time resins are impregnated into the molds. Thus, a considerable length of time is required for using the molds.

In a conventional process for the production of preforms, chopped fibers and resin powders are spread into a preforming mold in a spreading fashion to make preforms. However, the rate of production has been low with increased variations of the inputs of the powders and chopped fibers. This results in a decrease in the physical values of the preforms.

Heretofore, material has been molded by a method including applying suction on the back side of an air-permeable mold, thereby adsorbing reinforcing fibers onto the surface of the mold. Thereafter, powder particles for a synthetic resin matrix are sprayed onto a group of the adsorbed fibers.

According to the above method, it is difficult to disperse and retain the powder particles for the synthetic resin matrix uniformly throughout the group of the adsorbed fibers during the spraying. As a result, there is a fear that any composite of high quality may not be obtained due to problems wherein the powder particles are locally distributed onto the surface side of the group of the adsorbed fibers or are susceptible to dislocation.

Heretofore, fiber reinforced plastic moldings have usually been produced by using injection molding, sheet molding compound (SMC) or other like techniques. In general, the injection molding technique is suitable for small-sized moldings and the SMC technique is applicable to large-sized moldings.

In recent years, it has been proposed to form automotive outer sheets and other parts from fiber reinforced plastic moldings. In an effort to form automotive bodies of fiber reinforced plastic moldings, it has been found that difficulty is encountered in conventional methods due to the extremely large size of the automotive bodies and the sophisticated configuration.

OBJECTS AND SUMMARY OF THE INVENTION

The present invention provides a solution to the mold heating and cooling problem encountered in a conventional process by preheating preforms.

The impregnation and cooling of resins are simultaneously carried out by cold pressing in a mold. Thus, remarkable improvements in the rate of production are achieved by the present invention.

An object of a second embodiment of the present invention is to provide a process for the production of preforms which can be manufactured at a higher rate of production, with decrease variations of the inputs of powders and chopped fibers while obtaining improvements in the uniformity of the molding.

In view of the foregoing method for molding materials, it is an object of the present invention to provide a method making it possible to obtain the material throughout, wherein the powder particles for the synthetic resin matrix are dispersed uniformly.

No particular problem arises when moldings are formed in a flat sheet or gently bent forms are obtained with such a method for molding fiber reinforced plastics; however, a problem with molding exists when it is intended to make moldings to include portions that are substantially vertical with respect to the main parts. Moldings having poor appearance and strength are only obtained with respect to vertical portions due to insufficient pressure applied to the vertical portions. It is therefore an object of the present invention to provide a molding die system in which moldings, including portions substantially vertical with respect to the main parts, can be obtained with improved appearance and strength by applying sufficient pressure to the vertical portions. A method is disclosed for making moldings with the use of such a molding die system.

The present invention provides a process for the high speed production of fiber reinforced plastic moldings wherein several preforms, formed and solidified with chopped fibers, resin powders and a binder, are held between two preheating plates. The preheating plates are each formed of a thin metal plate to reheat the preforms to a temperature higher than the melting point of the resin. Because the preforms remain held between the preheating plates, the preforms are cold pressed in a mold maintained at a temperature lower than the melting point of the resin for simultaneous impregnation and cooling of the resin.

A second embodiment of the present invention provides a process for the production of preforms wherein a preforming mold is placed in a vacuum chamber. Precut chopped fibers are positioned in a tank. An exhauster is actuated to vacuumize both the vacuum chamber and the preforming mold, thereby blowing up and adsorbing the chopped fibers in the tank onto the preforming mold and forming on the surface of the preforming mold an unsolidified preform including the chopped fibers. A resin powder is then sprayed onto the preform in this state for adsorption. Subsequently, a binder is applied under reduced pressure onto the preform and the preform is dried. The chopped fibers are thereby solidified along with the binder.

A third embodiment of the present invention provides a process for molding materials used for fiber reinforced composites including a synthetic resin matrix and reinforcing fibers dispersed throughout the synthetic resin matrix. The powder particles for the synthetic resin matrix are uniformly mixed with the reinforcing fibers to prepare a material to be molded. Suction is applied on the back side of an air-permeable mold to adsorb the material to be molded onto the surface side of the mold. According to this process, a material with powder particles for the synthetic resin matrix dispersed and retained throughout the material is obtained by the adsorptive operation of the material to be molded onto the mold.

To enable molding of a substantially vertical portion, the present inventors have found that a pressurizing force to a top die, designed to be lower in a vertical direction, may be converted into a pressurizing force in a horizontal direction. Thus, uniform pressurizing force is applied to even a vertical portion.

More specifically, the die system for molding fiber reinforced plastic moldings according to the present invention is especially designed to make fiber reinforced plastic moldings having portions substantially vertical with respect to the main parts. A bottom die section includes a substantially vertical molding surface, a back-up die section including an inclining pressurizing surface located in opposition to the molding surface and an elastomer die section including a wedge-shaped portion to be interposed between both of the old die sections.

The method for making fiber reinforced plastic moldings according to the present invention is especially designed to produce fiber reinforced plastic moldings having portions substantially vertical with respect to the main parts. A molding die system includes a bottom die section having a substantially vertical molding surface, a back-up die section including an inclining pressurizing surface located in opposition to the molding surface and an elastomer die section including a wedge-shaped portion to be interposed between both of the die sections. A fiber reinforced plastic preform is placed on the bottom die section, the elastomer die section is first positioned in place and the back-up die section is then mounted in place to pressurize the preform in a vertical direction. Thus, pressurizing force is applied to the planes of the preform in a substantially perpendicular direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 12(a)–12(e) are views illustrative of the process of the production of the fiber reinforced composite;

DETAILED DESCRIPTION OF THE PREFERRED EMBODIMENTS

In the present invention, the preforms are preheated with the preheating metal plates for the purpose of preventing deformation, failure, etc. due to preheating, thereby keeping the shape of the preforms intact. Unlike the mold which is used together with the present invention, the preheating plates can be very easily heated because of the thinness of the plates. The preheating plates offer an advantage enabling preheating to occur for a shorter period of time with less energy.

At this stage, only preheating takes place to melt the resin. The impregnation and cooling of the resin do not occur. Subsequently, the mold is used to effect cold pressing rather than to heat and melt the resin.

Therefore, heating the mold to a high molding temperature is not required. In addition, it is not required to cool the mold. Satisfactory results are obtained by maintaining the mold at a much lower temperature. Accordingly, reductions in energy loss are achieved along with increases in the rate of molding.

The present invention utilizes molding by heating which is separated from the impregnation and cooling of the resin by cold pressing. Preheating is carried out, while the preforms are held between the preheating metal plates. Unlike the mold used together with the present invention, the metal plates provide good service in a thickness of 10 mm or less, so that heating occurs easily. The metal plates are needed to keep the shape of the preforms intact during preheating.

The preforms previously heated and formed by the preheating metal plates are introduced into the mold. The mold is operated by cold pressing for simultaneous impregnation and cooling of the resin rather than by heating. Thus, it is not necessary to carry out a heating and cooling of the mold as required in the prior art.

The preheating and preforming of the preforms are separated from cold pressing. One molding can be produced within about 5 minutes at an increased rate of production.

EXAMPLE 1

Two powder-integral type preforms obtained with carbon fibers and nylon 6 powders by a suction system are held between plates of 0.6 mm with a spacer of 1.8 mm interposed between the preforms. The preforms are preheated at 250° C. for 20 minutes to obtain preformed products.

While the preformed products remain held between the plates, the preformed products are then charged into a mold of 190° C., wherein the preformed products are cold pressed at a pressure of 20 Kg/cm² for 5 minutes for simultaneous impregnation and cooling of the resin. Thereafter, the preformed products are removed from the molding. In this manner, an FRP molding was produced.

Figure 1:
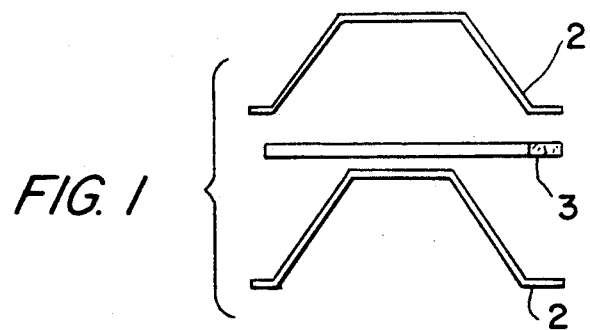
FIGS. 1 and 2 are side views illustrative of a section of the preheating step in the process of the production of FRP moldings according to the present invention.
Figure 2:
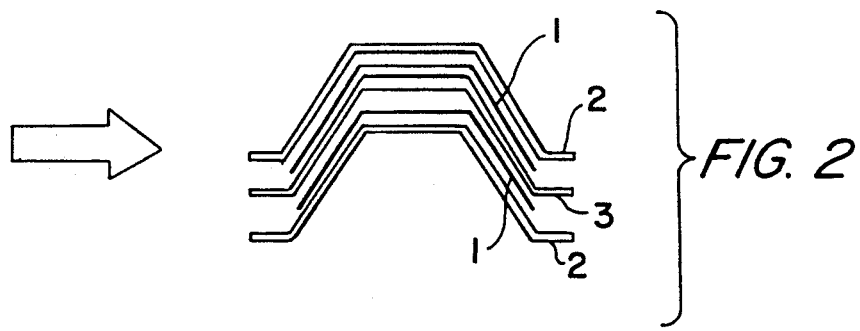
Figure 3:
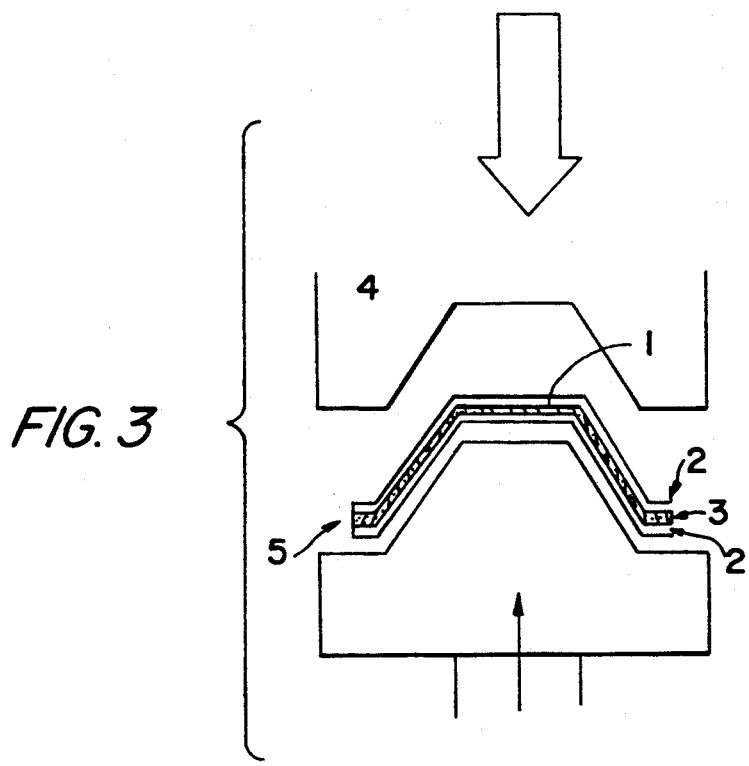
FIG. 3 is a sectional side view of the mold for cold pressing and the resulting molding.

Referring to FIG. 1, preheating metal plates 2 of 0.6 mm, and a spacer 3 of 1.8 mm are provided. As illustrated in FIG. 2, two preforms 1 are held between the two preheating metal plates 2. The spacer 3 is inserted in between the preforms. In this state, the preforms are preheated at 250° C. for 20 minutes for preforming.

While the resulting preforms remain held between the preheating plates, the preforms are then charged into a mold 4 maintained at 190° C. The preforms are cold pressed at a pressure of 20 Kg/cm² for 5 minutes for simultaneous impregnation and cooling of the resin. In this way, a molding 5 was obtained.

According to a second embodiment of the present invention, chopped fibers are first adsorbed onto the preforming mold under the action of reduced pressure. Unlike the spreading process, the chopped fibers are selectively adsorbed onto regions of the preforming mold onto which chopped fibers have not been deposited.

Accordingly, the chopped fibers are preferentially deposited onto regions of the preforming mold onto which the chopped fibers have been deposited in a small amount or thickness; however, in a conventional spreading fashion, the preforms are unlikely to be uniform in thickness, since the chopped fibers not selectively deposited onto deposit free regions of the preforming mold.

In the order identified above, the chopped fibers and resin powders are adsorbed onto the preforming mold to obtain preforms, thereby assuring sufficient impregnation of the resin.

In a second embodiment of the present invention, the binder is further applied onto the preforming mold while vacuumizing after the spraying of the powders. Thus, the binder can be uniformly applied onto the preform and sufficiently penetrate into the preform. The binder is then well dried to a solid state to provide a preform.

Figure 4:
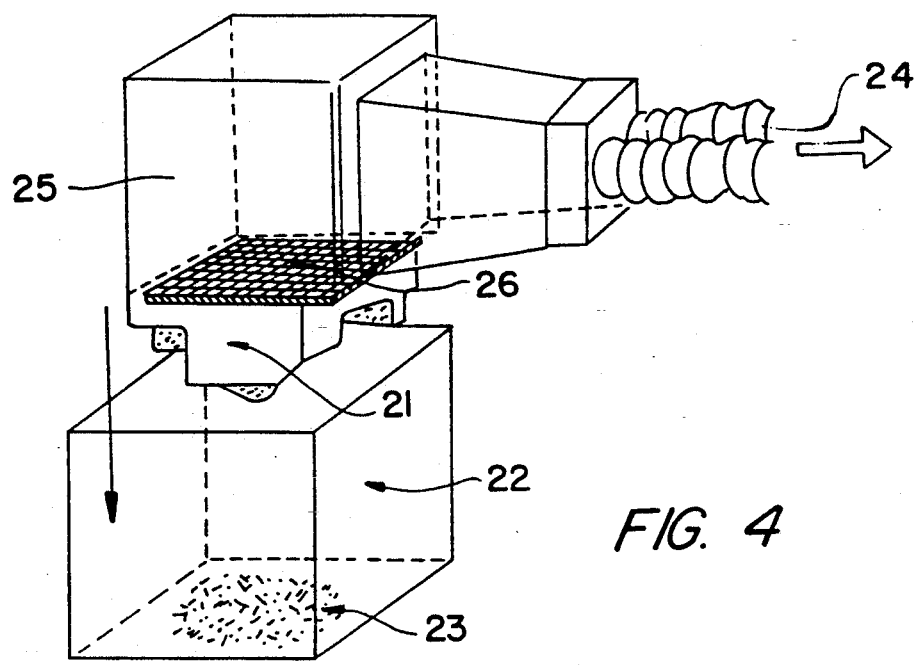
FIG. 4 is a view of one embodiment showing the invention.

Referring to FIG. 4, an exhauster 24 is placed in a vacuum chamber 25. Disposed within the vacuum chamber 25 is a preforming mold 21. A honeycomb layer 26 for rectification is provided between the preforming mold 21 and the exhauster 24. Cut chopped fibers 23 are charged in a chop tank 22.

As the vacuum chamber 25 is vacuumized by the exhauster 24 with the preforming mold inserted into the chop tank, the preforming mold is correspondingly vacuumized to adsorb the chopped fibers 23 onto the preforming mold. In this embodiment, the chopped fibers are successively adsorbed onto regions of the preforming mold onto which the chopped fibers have not been deposited at all or deposited in a small amount to give a layer of uniform thickness. Subsequently, nylon 6 powders are sprayed onto the preform under continued reduced pressure.

After the completion of powder spraying, a 20% solution in methanol of nylon (A-70, Registered Trademark of Toray Industries, Inc.) soluble in an alcohol is diluted to 5% and sprayed onto the preform under further continued reduced pressure for sufficient impregnation and adsorption of the nylon into the chopped fiber layer of the preform.

Under still further continued reduced pressure, the solvent was removed, and the resulting product was dried to a solid state to provide a solidified preform including the chopped fiber and nylon powders.

Figure 5:
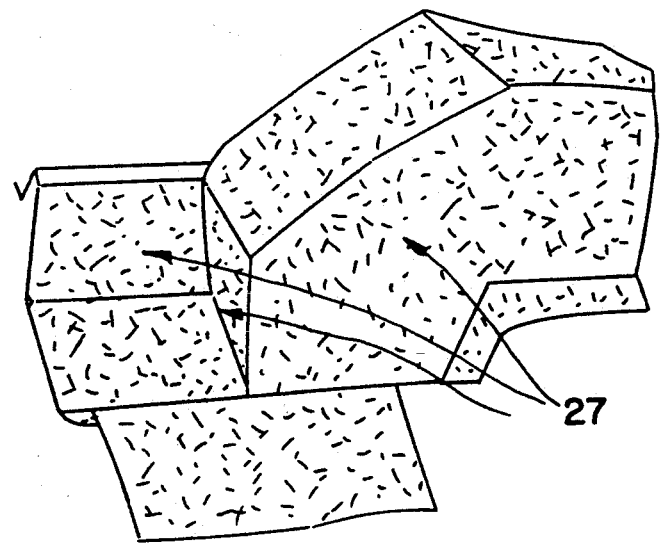
FIG. 5 is a front view of the obtained preform, illustrative of the powders being sprayed onto a vertical wall portion.

FIG. 5 illustrates a front view of a preform wherein the powders are sprayed onto vertical wall portions 27.

The preforms produced by the process according to a second embodiment of the present invention include the powders and chopped fiber in a uniform state, show no variation, possess uniform physical values and are produced at a higher rate of production. The preforms are very useful.

Figure 6:
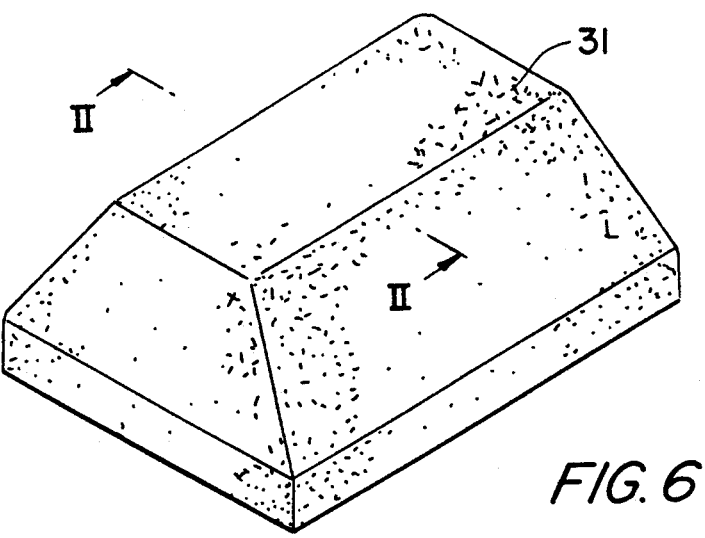
FIG. 6 illustrates a fiber reinforced composite.
Figure 7:
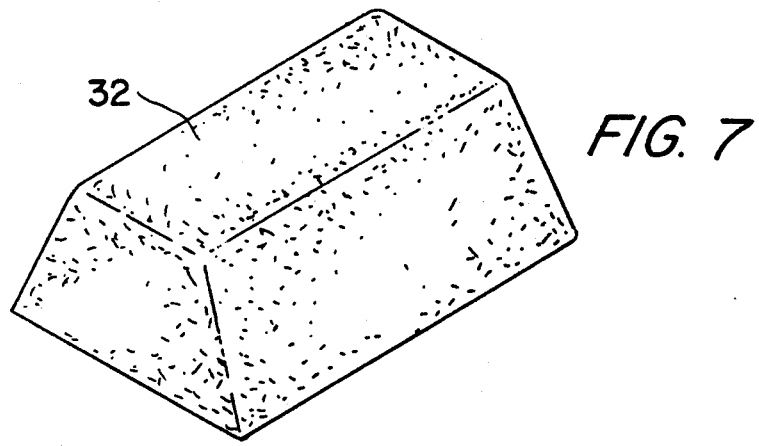
FIG. 7 is a perspective view of the fiber reinforced composite.
Figure 8:
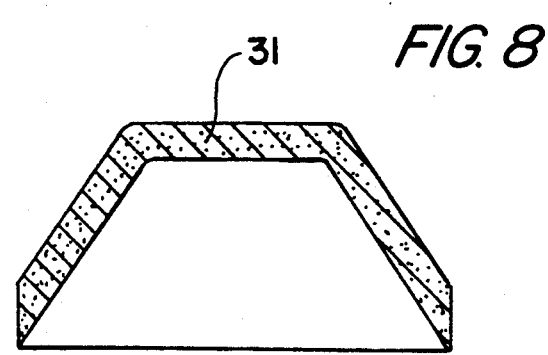
FIG. 8 is a sectional view taken along the line II—II of FIG. 6.

FIGS. 6, 7 and 8 illustrate a box fiber reinforced composite 31, which includes a synthetic resin matrix such as nylon and reinforcing fibers such as carbon fibers dispersed throughout the matrix. A box material 32 is used for the production of the fiber reinforced composite 31.

Figure 9:
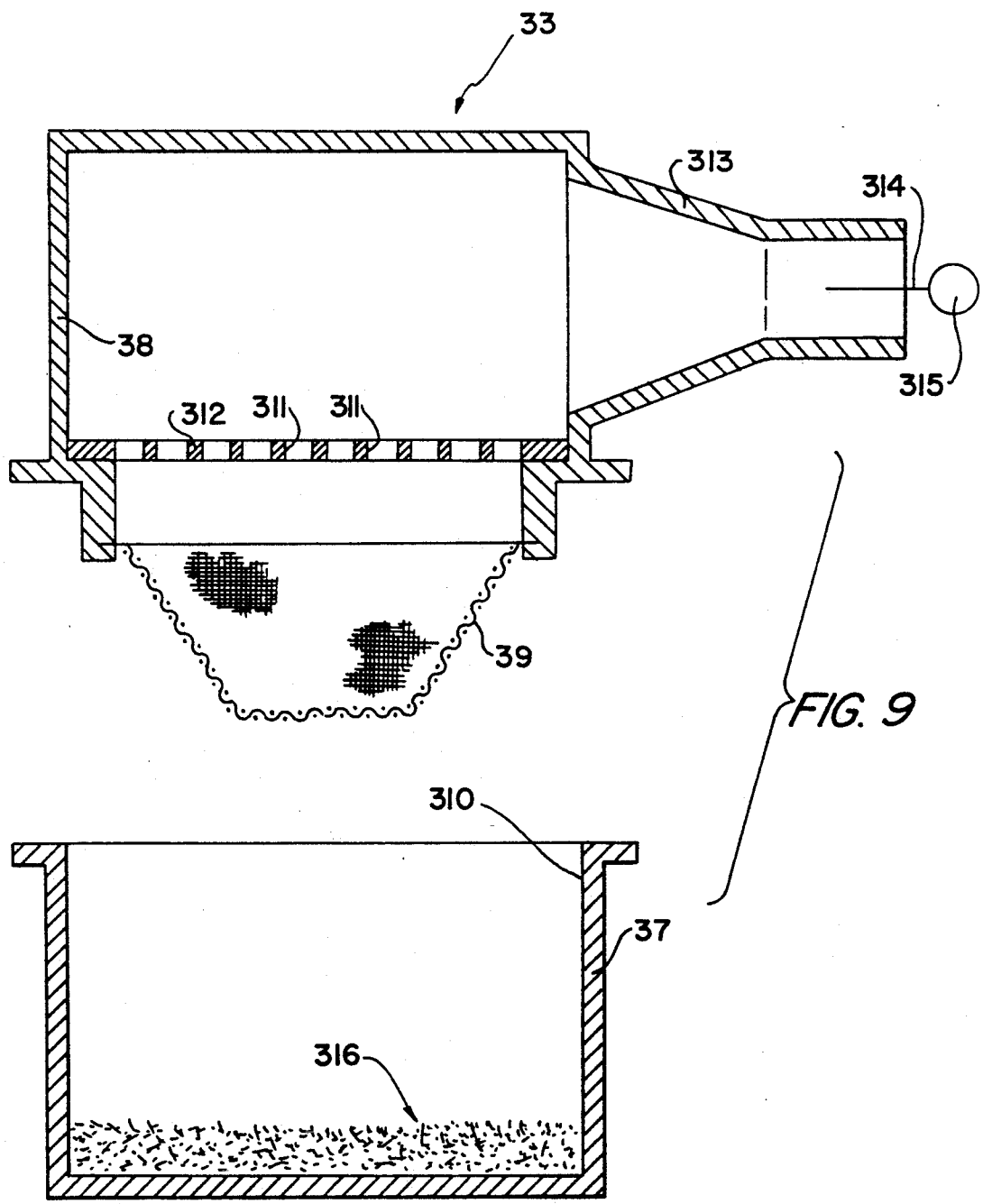
FIG. 9 is a longitudinal sectional view of the molding machine.

As illustrated in FIG. 9, the molding machine 33 includes a tank 37 including an upper face having an 1 opening. The tank 37 is designed to store the material to be molded. An elevatable suction box 38 is disposed above the tank 37. An air-permeable mold 39 depends from a lower portion of the suction box 38. In operative association with the ascent or descent of the suction box 38, the mold 39 is inserted into or removed from within the tank 37 through the opening 310. A space defined on the back side of the mold 39 is divided from the interior of the suction box 38 by a rectifying plate 312 having numerous air-permeable pores 311 formed therein. A connector 313 extends from one side of the suction box 38 and is connected to a suction fan 315 via a duct 314.

Figure 10:
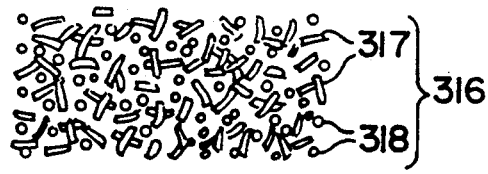
FIG. 10 is an enlarged view illustrative of the material to be molded.

FIG. 10 is an enlarged view illustrating the molded material 316 formed of chopped fiber type reinforcing fibers 317 with powder particles 318.

Material 316 to be molded is charged into the tank 37. The material 316 has been prepared by uniform mixing of chopped fiber type reinforcing fibers 317 with powder particles 318, as illustrated in FIG. 10, for the synthetic resin matrix. The mold 39 is in form of a network having a mesh size smaller than the diameter of each powder particle 318.

Figure 11B:
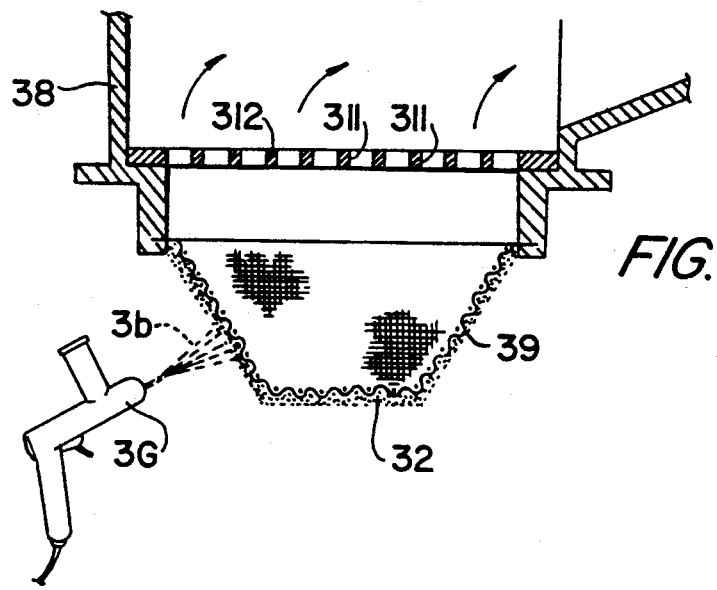
FIGS. 11(a) and 11(b) are views illustrative of the steps of molding the material.
Figure 11A:
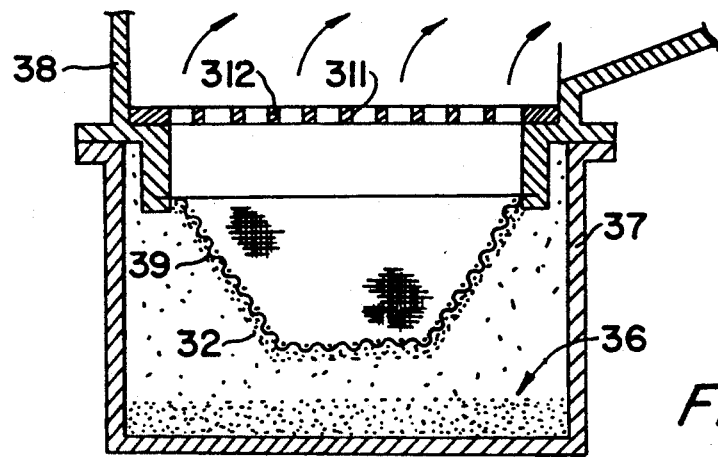

In the molding operation, the suction box 38 is lifted down, to move the mold 39, into the tank 37, as shown in FIG. 11(a). The suction fan 315 is actuated to apply suction on the back side of the mold 39. The suction is applied on the entire back side of the mold 39 in a substantially uniform manner under the rectification of the rectifying plate 312.

The material 36 which is to be molded is adsorbed together onto the surface of the mold 39 to provide the material 32 throughout which the powder particles are dispersed and retained uniformly.

Thereafter, the suction box 38 is lifted up under similar suction as mentioned above, as shown in FIG. 11(b), to remove the mold 39 from within the tank 37. A synthetic resin binder 3b, such as soluble nylon, is sprayed onto the material 32 through a spray gun 3G to provide shape retention thereto. The suction is cut off to release the material 32 from the mold.

After releasing, the material 32 is heated at a low temperature to cure the synthetic resin binder 3b, to thereby increase the handling capability of the material 32.

Figure 12A:
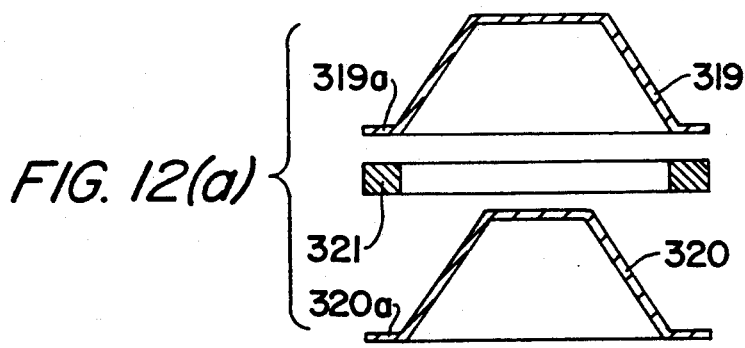

The production of the fiber reinforced composite 31 will now be explained with reference to FIGS. 12(a)–12(e). As illustrated in FIG. 12(a), an upper box plate 319 is flanged at 319a. A lower box plate 320 is similarly flanged at 320a. A frame like spacer 321, held between both flanges 319a and 320a, is heated at 250° C. for 40 minutes.

Figure 12B:
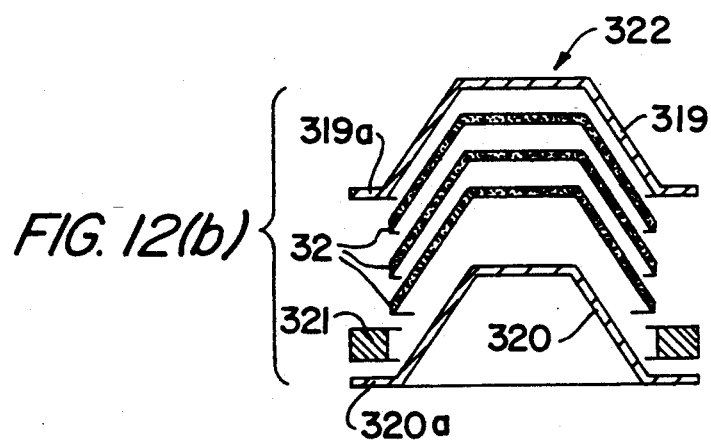

As illustrated in FIG. 12(b), three materials 32 are held between the upper and lower plates 319 and 320, while the spacer 321 remains held between both flanges 319a and 320a. The resulting laminate 322 is preheated at 250° C. for 40 minutes.

Figure 12C:
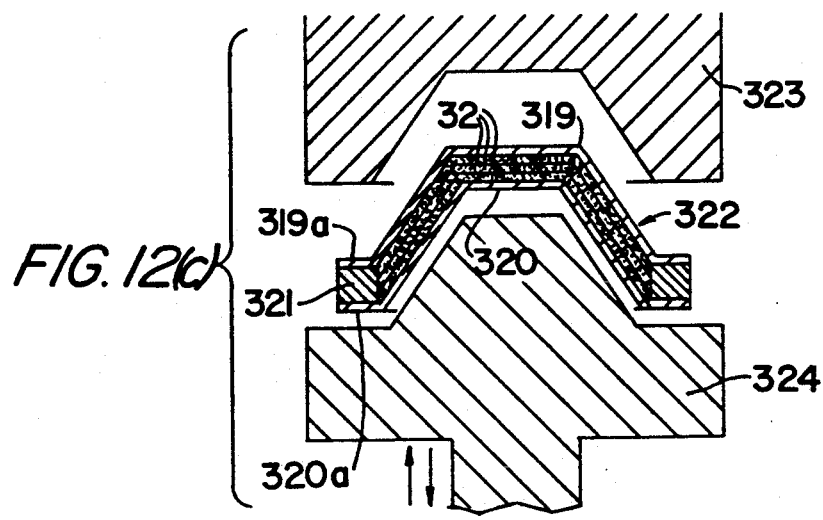

As shown in FIG. 12(c), the laminate 322 is held between a stationary top mold 323 and a movable bottom mold 324. Both molds 323 and 324 are heated to 185° to 190° C. The bottom mold 324 is pressed toward the upper mold 323 at a pressure of 20 Kg/cm$^2$ for cold pressing. This cold pressing causes the whole material 32 to be impregnated with a melt of the powder particles 318 for the interconnection of the fibers. Thus, the fiber reinforced composite 31 is molded and cooled at the same time. Since the powder particles 318 are dispersed uniformly throughout the material 32, the impregnation occurs efficiently.

As illustrated in FIG. 12(d), the molded laminate 322 is released from the mold. As illustrated in FIG. 12(e), the top and bottom plates 319 and 320 and the spacer 321 are finally removed from the fiber reinforced composite 31.

According to the third embodiment of the present invention, it is possible to easily mold materials throughout which the powder particles for the synthetic resin matrix are dispersed and retained uniformly in a stable manner. Further, since the present invention is carried out by the adsorptive operation alone, it is possible to simplify the process of production, resulting in improvements in mass productivity and a reduction in the production cost.

Figure 13:
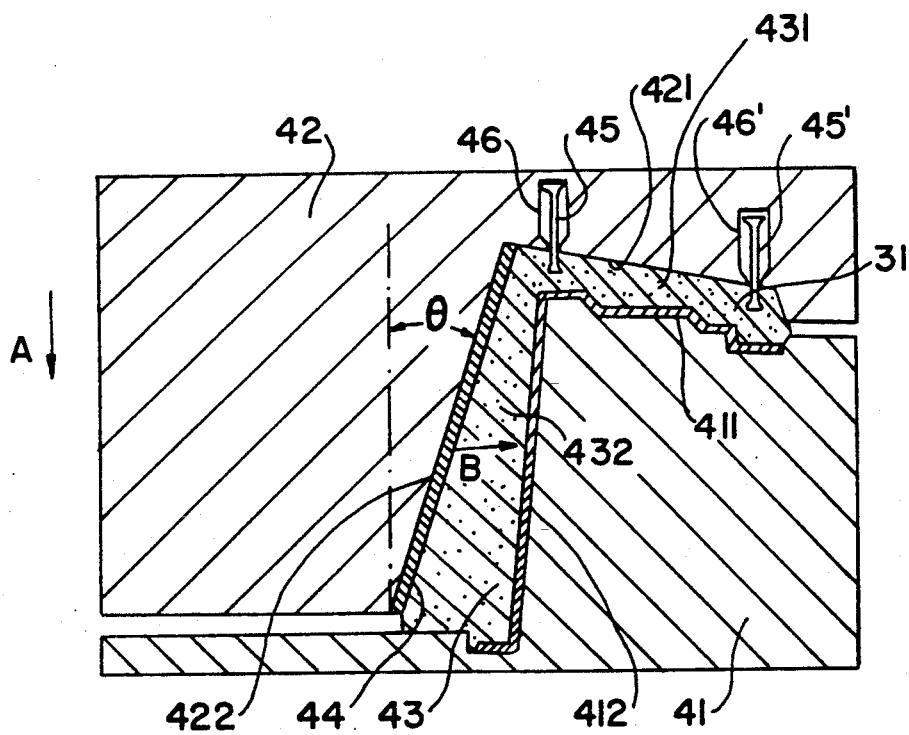
FIG. 13 is a sectional view showing one example of the die system for molding fiber reinforced plastics according to the present invention.

FIG. 13 is a sectional view showing one example of the die system for molding fiber reinforced plastics according to the present invention. The molding die system comprises a bottom die section 41, a back-up die section 42 and an elastomer die section 43. The bottom die section 41 includes a molding surface 412 substantially vertically disposed with respect to a molding surface 411 for molding the main part. The back-up die section 42 includes a molding surface 421 corresponding to the molding surface 411 of the bottom die section 41 and a pressurizing surface 422 in opposition to the substantially vertical molding surface 412 of the bottom die section 41 and slightly inclining with respect thereto. Preferably, the pressurizing surface 422 is at an angle of at least 15° with respect to perpendicular. The angle $\theta$ is in a range of more preferably 15° to 60°, most preferably 15° to 30°. At an angle $\theta$ below 15°, it is difficult to uniformly apply pressure to a perpendicular plane.

The elastomer die section 43 to be interposed between the bottom die section 41 and the back-up die section 42 includes a portion 431 to be located between the molding surfaces 411 and 421 and a wedge-shaped portion 432 to be located in a wedge-shaped space defined between the substantially vertical molding surface 412 and the pressurizing surface 422.

It is desired that a spacer plate 44 is positioned between the outer surface of the elastomer die section 43 and the pressurizing surface 422 to achieve uniform pressurization. The portion 431 of the elastomer die section 43 is provided with a plurality of guide pins 45 and 45' for positioning the elastomer die section 43. The guide pins 45 and 45' are detachable received in holes 46 and 46' in the back-up die section 42.

It is required that the elastomer die section 43 should be of elasticity sufficient to convert vertically acting force to uniform transverse pressurizing force. At the same time, the elastomer die section 43 is required to be of a heat resistance sufficient to prevent the elastomer die from suffering from deformation, deterioration, etc. during the heating and pressurizing of moldings. In addition, the section is required to be formed of a material allowing easy releasing of fiber reinforced plastic moldings. In view of the foregoing, it should be preferably formed of silicone rubber or fluororubber. The elastomer die section 43 may vary in thickness, but should preferably have a thickness of about 50 to 80 mm to make the elastomer die pressurizing force uniform. If the rubber die section is kept constant with a core designed to accommodate any variation, a limitation is not imposed upon the thickness of the rubber die section.

The spacer plate 44 does not only make the pressurizing force uniform as mentioned above, but also serves to improve the slidability of the back-up die section 42 relative to the elastomer die section 43. With modifications made to the thickness, shape, etc. of the spacer plate 44, it is possible to locally increase or decrease the pressurizing force.

Figure 14A:
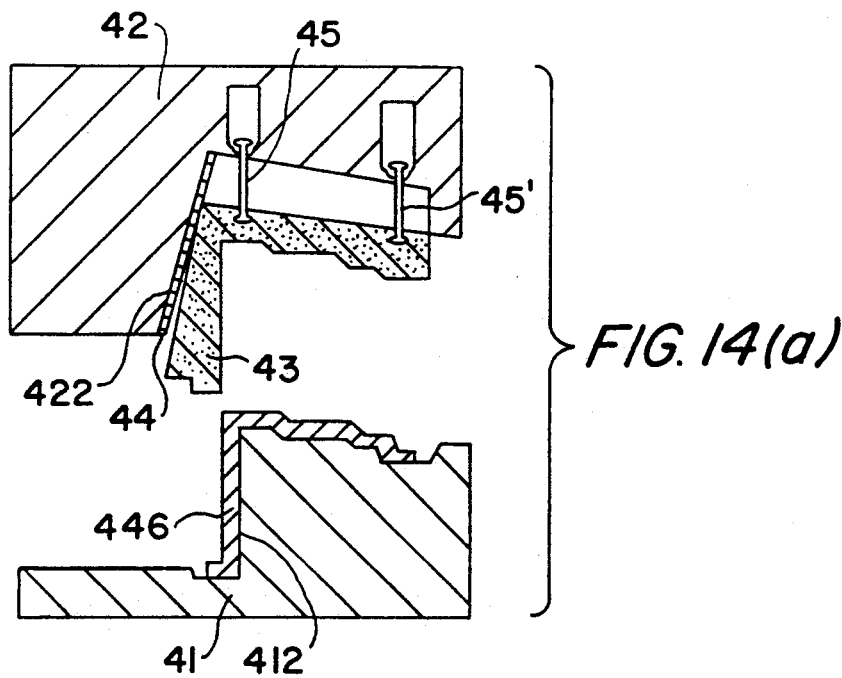
FIGS. 14(a)–14(c) are sectional views of the molding die system illustrating the method for making fiber reinforced plastic moldings according to the present invention.
Figure 14B:
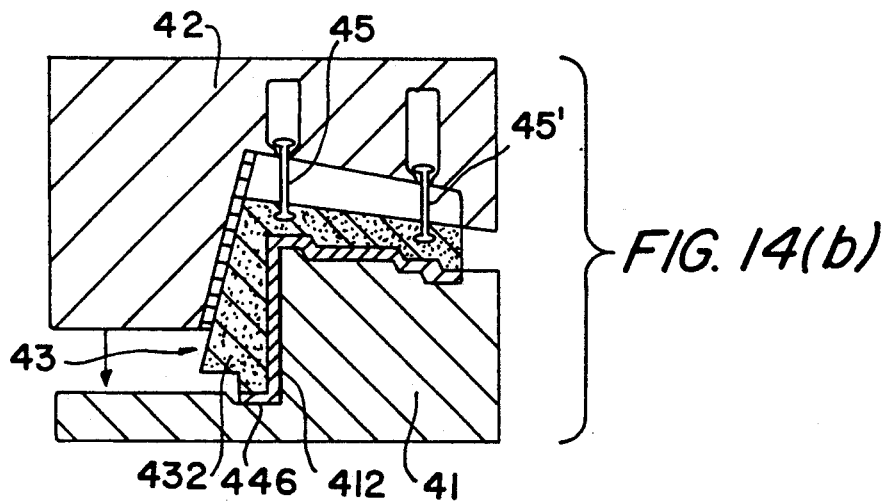

As illustrated in FIG. 14(a), to obtain fiber reinforced plastic moldings with the above molding die system, a stack of the required number of prepared fiber reinforced plastic preforms 446 is first placed on the bottom die section 41 and heated to a predetermined temperature. Then, the back-up die section 42 is lowered, to put the elastomer die section 43 on the preforms 446, as illustrated in FIG. 14(b). The wedge-shaped portion 432 of the elastomer die section 43 abuts on the preforms 446 on the substantially vertical surface 412. Thereafter, the back-up die section 42 is completely lowered to bring the pressurizing surface 422 in pressure contact with the elastomer die section 43. Thus, the perpendicular pressurizing force exerted by the lowering of the back-up die section 42 is converted into horizontal pressure by the inclining pressurizing surface 44 of the back-up die section 42. While sufficient pressure is then applied to the preforms 446 on the substantially vertical molding surface 412 through the wedge-shaped elastomer die section 43, the plastic component is melted, cooled and hardened to prepare a molded article 47.

In this case, the elastomer die section 43 is formed on a surface facing the preforms 446 into a shape conforming to the shape of the preforms 446 and is offset at a portion opposite to the substantially vertical molding surface 412 so as to prevent the elastomer die section 43 from coming in firm contact with the preforms 446, when placed thereon from above. Hence, the preforms 446 are prevented from being dragged in during closure. To achieve accurate positioning of the elastomer die section 43, it is suspended down from the back-up die section 42 by means of the guide pins 45 and 45'. Thus, pressurizing can commence with the elastomer die section 43 in accurate contact with the preforms.

In this connection, it is desired that the bottom die section is processed on a molding surface with a fluorine resin to improve the releasability of moldings.

As mentioned above, the resin of the preforms may be melted, cooled and hardened in the molding die system. It is understood, however, that the resin of the preforms may be previously melted by heating, while it is sandwiched between thin metal sheets, and then pressurized, cooled and hardened in the molding die system.

The preforms for moldings may be prepared by chopped fibers such as chopped carbon or glass fibers uniformly adsorbed onto a porous preform molding die, followed by the adsorption of resin powders by blowing. A binder is then applied to harden and dry a preform, thereby obtaining a preform in which the chopped fibers are uniformly blended with the resin powders. As for the resin powders, use should preferably be made of thermoplastic resins.

As explained in the foregoing, upon the back-up die section 42 which is lowered to apply pressure in the vertical direction as shown by an arrow A, as illustrated in FIG. 13, the pressure is converted into horizontal pressure, as shown by an arrow B, as illustrated in FIG. 13, by the pressurizing surface 422 that inclines at an angle $\theta$ with respect to a perpendicular plane. Accordingly, the preforms on the substantially vertical molding surface 412 of the bottom die section can also be pressurized and molded by the vertical pressurization of the back-up die section 42. Thus, it is possible to construct moldings of sophisticated configuration including vertical and horizontal planes.

Moreover, the pressuring force acting upon the preforms is applied so uniformly that moldings having improved appearance and strength can be obtained because of the presence of the wedge-shaped portion 432 of the elastomer die section 43 in a space defined between the molding surface 412 of the bottom die section 41 and the pressuring surface 422 of the back-up die section 42.

EXAMPLE 2

Carbon fibers in the form of reinforcing chopped fibers and nylon powders were adsorbed onto a preform molding die, and a 5% solution of alcohol-soluble nylon A-70 (available from Toray Industries, Inc.) in methanol was sprayed thereonto and dried to obtain a preform including a vertical plane.

Figure 14C:
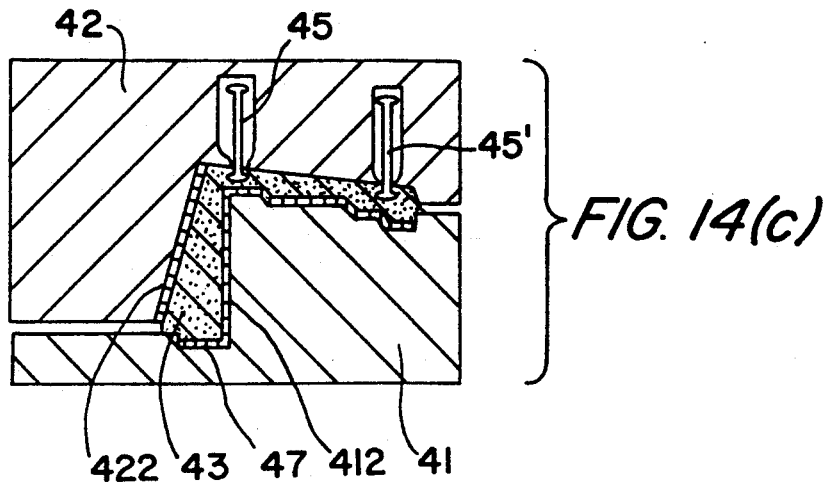

A stack of three preforms, each obtained as mentioned above, was placed on a single molding iron sheet on which the preforms were heated at 240° C. for 20 minutes. While placed on the iron sheet, the preforms were set on the bottom section 41 of the molding die system illustrated in FIG. 13 and then pressurized and molded according to the procedures shown in FIGS. 14(a)–14(c). The heating temperature of the molding die system was 190° to 200° C., the molding pressure of the back-up die section 42 was 20 Kg/cm$^2$, the angle $\theta$ of the pressuring surface 44 of the back-up die section 42 with a perpendicular plane was 15°, and the elastomer die section 43 used was formed of silicone rubber (Hardness: JISA 50-70).

The obtained article was uniformly pressurized and molded on both its horizontal and vertical planes, and had improved appearance and strength.

According to the present invention, it is possible to pressurize a vertical plane by vertical pressurization, because vertical pressurizing force is converted into horizontal force. Accordingly, it is possible to obtain a molded article of sophisticated configuration having horizontal and vertical planes, while applying sufficient pressure to the planes. Thus, it is possible to make fiber reinforced plastic moldings of sophisticated configuration and excelling in appearance and strength by a single pressurizing operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A process for the high speed production of fiber reinforced plastic moldings comprising the following steps:

forming several preforms formed and solidified with chopped fibers, resin powders and a binder, each preform includes a base member having outwardly projecting wall members extending therefrom, said wall member being disposed at a predetermined angle relative to said base member;

holding said several preforms between two preheating plates, each of said plates being formed of a thin metal sheet;

preheating the several preforms to a temperature higher than the melting point of the resin; and cold-pressing said preforms in a nested condition in a mold maintained at a temperature lower than the melting point of said resin for simultaneously impregnating said chopped fibers with said resin and cooling said resin while said preforms are held between said preheating plates.

2. A process for the production of preforms comprising the following steps:

placing a preform mold in predetermined position relative to a vacuum chamber;

positioning precut chopped fibers in a tank;

inserting the preform mold into said tank wherein the preform mold extends into and is in communication with said chopped fibers;

actuating an exhauster to vacuumize both the vacuum chamber and the preforming mold, thereby adsorbing the chopped fibers in the tank onto the preforming mold and forming on the surface of the preforming mold an unsolidified preform comprising the chopped fibers;

removing said preform from said tank;

spraying resin powders onto said preform for adsorption; and subsequently applying under reduced pressure a binder onto said preform and drying the preform, thereby solidifying the chopped fibers along with the binder.

3. A method for making fiber reinforced plastic moldings including portions extending substantially vertical with respect to a main portion wherein a molding die system having a bottom die section includes an inclining pressurizing surface located in opposition to said molding surface and an elastomer die section includes a wedge-shaped portion to be interposed between both said bottom and back-up die sections, comprising the following steps:

placing a fiber reinforced plastic preform, having a base member and outwardly extending walls projecting therefrom at a predetermined angle, on said bottom die section;

positioning said elastomer die section in contact with said fiber reinforced plastic preform; and mounting said back-up die section in place to contact said elastomer die section to pressurize said preform in a vertical direction;

applying pressurizing force to the base member and the outwardly extending walls of said preform in a substantially perpendicular direction relative to the substantially vertical portions and main portion of said fiber reinforced plastic molding for forming said fiber reinforced plastic moldings.

4. A method for making fiber reinforced plastic moldings according to claim 3, wherein applying said pressurizing force utilizes an angle of said pressurizing surface with respect to a perpendicular surface relative to said main portion of at least 15°.

5. A method for making fiber reinforced plastic moldings according to claim 3, and further including the step of supplying a spacer plate interposed between said elastomer die section and said pressurizing surface.

6. A method for making fiber reinforced plastic moldings according to claim 4, and further including the step of supplying a spacer plate interposed between said elastomer die section and said pressurizing surface.

* * * * *